April 22, 1947.  P. J. STAAB  2,419,424
METHOD OF BONING HAMS
Filed Oct. 5, 1944
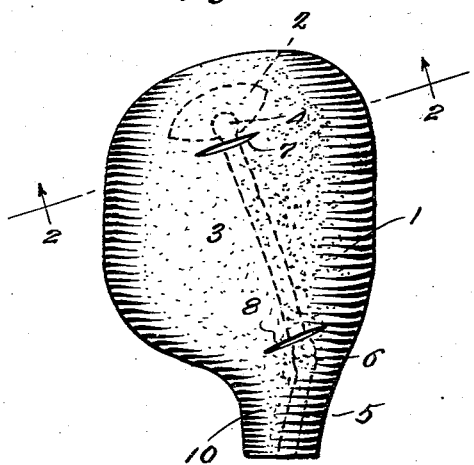
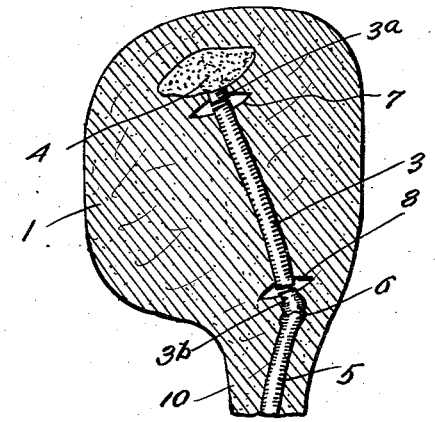
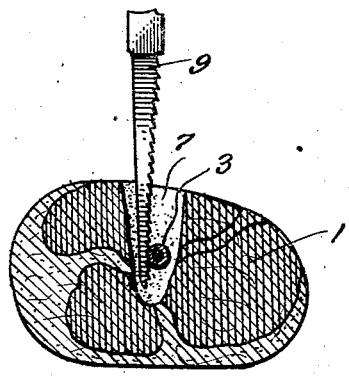
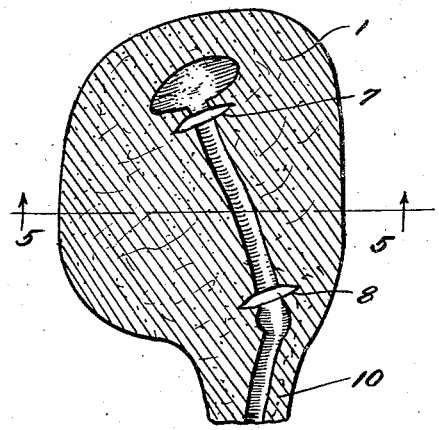
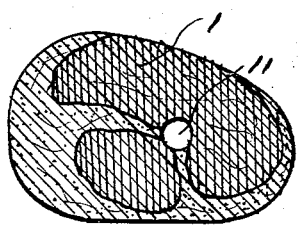
Inventor
PETER J. STAAB
By Ross J. Woodward
Attorney Patented Apr. 22, 1947

2,419,424

UNITED STATES PATENT OFFICE 2,419,424

METHOD OF BONING HAMS

Peter J. Staab, Stuttgart, Ark.

Application October 5, 1944, Serial No. 557,295

2 Claims. (Cl. 17—45)

This invention relates to a method of boning hams which may be either cooked or raw. At the present time it is customary to remove bones from a ham by cutting the ham longitudinally of the bones and then removing the bones, after which the ham must be tied with string passed about the ham or sewed along the cut in order to hold the ham in proper shape. It is also customary at the present time to compress a boned ham in a mold and cook the ham while in the mold so that the ham will be shaped while being cooked.

These methods have been found unsatisfactory as the hams are cut longitudinally in order to remove the bones and when slices are cut from the hams in a store, each slice has a cut in it leading from its edge to the opening formed when the bone is removed and the slice of ham is liable to open along this cut. If the ham is cooked whole without being compressed in a mold it is liable to open along the cut made when removing the bone and, when it is cooked in a mold, it loses its original shape.

In order to overcome these objections it is one object of the invention to provide an improved method of boning a ham wherein the ham has only small incisions made transversely thereof near its ends for removal of the bones, the ham retaining its original shape and being capable of being sliced in a slicing machine when either raw or cooked. The slices thus formed are of the same shape and appearance as those cut by hand from a ham and, since the ham is cut in a slicing machine, the slices will be evenly cut and of a predetermined thickness throughout.

Another object of the invention is to provide a method of boning hams wherein special tools are not necessary, the tools used being those customarily found in butcher shops.

Another object of the invention is to provide a method easy to carry out and by means of which a ham may be very quickly boned.

In the accompanying drawings:

Fig. 1 is a view showing a ham formed with transverse slits near ends of the thigh bone.

Fig. 2 is a transverse sectional view on the line 2—2 of Fig. 1, showing the manner in which the thigh bone is cut with a saw.

Fig. 3 is a sectional view taken longitudinally through the ham.

Fig. 4 is a view similar to Fig. 3, the bones being removed.

Fig. 5 is a view taken transversely through a boned ham along line 5—5 of Fig. 4.

The ham shown in the drawings and indicated by the numeral 1, may be either raw or cooked. Such a ham, when delivered from a packer to a butcher has therein a hip bone 2, known as the aitch bone, a thigh bone 3 extending longitudinally of the ham and jointed to the aitch bone 2 by the ball and socket joint 4, and leg bones 5 connected with the lower end of the bone 3 by a knee joint of stifle 6.

When such a ham is to be boned, the butcher places it upon a table and makes short incisions 7 and 8 in the meat transversely of the ham adjacent upper and lower ends of the thigh bone 3, a small knife being used having a blade not over one-half inch wide and ten inches long. The incisions are of sufficient depth to permit the point of the knife blade to penetrate below the bone 3, as shown in Fig. 2, and, referring to this figure, it will be seen that the meat is cut at opposite sides of the bone to such a distance that the blade of a saw 9 of the key-hole type may be inserted and operated to cut through the bone 3 close to the aitch bone 2 and the knee joint 6. The aitch bone is then cut loose from the ham with a knife and removed through the incision 7, together with the upper portion 3ª of the thigh bone attached thereto. After the aitch bone has been removed, a half-round chisel or gouge is thrust longitudinally of the ham along the bone 3 by inserting it through the incisions 7 and 8, reciprocating it longitudinally of the bone, and shifting it about the bone until the bone is entirely freed from the meat. Pressure is then applied to one end of the bone 3 to shove the bone longitudinally until it is entirely dislodged from the ham or until one end portion protrudes through the incision 7 or 8 a sufficient distance to permit it to be grasped and the bone pulled free from the ham. After the bone 3 has been removed, the leg bones 5 may be gouged free and removed from the hock 10 of the ham, together with the lower end portion 3ᵇ of the thigh bone, or it may be left in the hock, since this portion of the ham is seldom sliced when sold. When so boned, the ham retains its original appearance, except for the short slits or incisions 7 and 8, and since these incisions extend transversely of the ham, and the ham is sliced in the same direction in which the incisions are made, they will not cause slices cut from the ham to have cuts leading from their edges to the opening 11 from which the bone 3 is removed.

If the butcher has demand for the butt cut of the ham, he cuts that portion off along the line of the aitch bone, the cut being diagonally of the ham and not straight across since a diagonal cut gives more center cuts when cutting slices off the boned ham. The incision 8 is then made, the bone 3 sawed through close to the stifle joint 6, and the bone 3 freed with a gouge and removed. If desired, the incision 8 may be formed directly over the knee joint at the front edge thereof, the round bone thereof being disjointed and bone 3 then loosened with a gouge and pushed out with a steel rod. In each instance, the bone 3 is cut through by a saw inserted in a short incision made across the bone with a narrow-bladed knife and the bone 3 being then loosened with a gouge and extracted from the ham. The ham then retains its original shape and appearance and may be cut in a slicing machine to form slices of desired uniform thickness. Since the slices are cut with a slicing machine they will be of even thickness and the slices may be very rapidly cut from the ham.

Having thus described the invention, what is claimed is:

1. The method of boning a ham comprising forming short incisions in a ham transversely thereof across the thigh bone adjacent the aitch bone and the stifle joint, said incisions being of a depth to extend beyond the thigh bone, cutting through the thigh bone adjacent upper and lower ends thereof, removing the aitch bone from the ham through the adjacent incision together with the attached upper end of the thigh bone, thrusting a gouge into one incision and along the sawed thigh bone to loosen said bone from the meat, shifting the thigh bone longitudinally and out through one of said incisions, and withdrawing the leg bone and the attached lower end of the thigh bone from the hock of the ham through the incision adjacent the stifle joint.

2. The method of boning a ham comprising forming short incisions in a ham transversely thereof across the thigh bone adjacent the aitch bone and the stifle joint, said incisions being of a depth to extend beyond the thigh bone, forming cuts through the thigh bone close to the aitch bone and stifle joint, removing the aitch bone and attached upper end of the thigh bone from the ham through the adjacent incision, loosening the portions of the thigh bone between the cuts from the meat of the ham, extracting the loosened thigh bone longitudinally through one incision, and loosening the leg bones and attached lower end of the thigh bone and extracting same from the hock of the ham.

PETER J. STAAB.

REFERENCES CITED

The following references are of record in the file of this patent:

UNITED STATES PATENTS

| Number | Name | Date |
| --- | --- | --- |
| 511,927 | Brendon | Jan. 2, 1894 |
| 1,719,408 | Waters | July 2, 1929 |
| 1,959,022 | Donahoe | May 15, 1934 |
| 1,157,016 | Lotz | Oct. 19, 1915 |
| 2,227,738 | Oswald et al. | Jan. 7, 1941 |